United States Patent Office 2,978,502
Patented Apr. 4, 1961

2,978,502
PRODUCTION OF ORGANO-BORON COMPOUNDS

William David English, Garden Grove, and Allen L. McCloskey, Orange, Calif., assignors to United States Borax & Chemical Corporation, Los Angeles, Calif., a corporation of Nevada No Drawing. Filed Mar. 6, 1959, Ser. No. 797,565

4 Claims. (Cl. 260—551)

This invention relates as indicated to a method for producing organo-boron compounds and has particular reference to the production of borazoles.

The class of materials known as borazoles are heterocyclichexatomic ring compounds having the general formula $(BH-NH)_3$, and any substituents of the ring are named with "N" or "B" prefixes to designate their positions. The present invention is concerned with a particular group of borazoles wherein the "N" is substituted with alkyl or aryl radicals, and the "B" is substituted with alkylamino or arylamino radicals. This group of barozoles can be referred to generically as B-trialkylamino-N-trialkylborazoles and B-triarylamino-N-triarylborazoles. Additionally these compounds can be mixtures of the foregoing such as B-triarylamino-N-trialkylborazoles or B-trialkylamino-N-triarylborazoles.

It is, therefore, the principal object of this invention to provide a method for making borazoles wherein the "N" is substituted with alkyl and/or aryl radicals, and the "B" is substituted with alkylamino and/or arylamino radicals.

Other objects will appear as the description proceeds.

To the accomplishment of the foregoing and related ends, the invention then comprises the features hereinafter fully described and pointed out in the claims, the following description setting forth in detail certain illustrative embodiments of the invention, these being indicative, however, of but a few ways in which the principle of the invention may be employed.

Broadly stated, the present invention comprises the method of producing borazoles which comprises the reaction of a material selected from the group consisting of $(RNH)_3B$ and $(R_2N)_3B$ wherein R is a material selected from the group consisting of alkyl radicals having from 1–6 carbon atoms, phenyl, thiophenyl, and pyridyl radicals with a material selected from the group of amine salts of strong protonic acids consisting of $RNH_2:HA$, $R_2NH:HA$ and $R_3N:HA$ wherein R is a material selected from the group consisting of alkyl radicals having from 1–6 carbon atoms, phenyl, thiophenyl and pyridyl radicals, HA is a strong protonic acid, and wherein at least one of said reaction ingredients is derived from a primary amine.

It is important, at this point, to emphasize several important factors in the above broadly stated paragraph. It is immaterial to the present invention whether the R groups of both reaction ingredients are all the same or all different. Thus, for example, isopropylamine hydrochloride can be reacted with tris(isopropylamino)borane to produce B-tris(isopropylamino)-N-tri-isopropylborazole, or triethylamine sulfate can be reacted with tris(anilino)borane to produce B-tris(anilino)-N-triphenylborazole. Secondly, it will be seen that at least one of the reaction ingredients must be derived from a primary amine. Thirdly, and of the utmost importance, it will be noted that the strong protonic acid does not take part in the reaction but acts as a catalyzer. The amine salt of any strong protonic acid can be used to catalyze the present reaction. Thus such materials as the amine salts of sulfuric acid, hydrochloric acid, hydrobromic acid, trifluoracetic and amine salts of other strong protonic acids are all equally applicable to the present invention. When primary or secondary aminoboranes react with primary or secondary amine salts having R groups different than the R groups of the aminoboranes, there is an interchange of the alkylamino groups during the reaction. However, when a primary aminoborane reacts in the presence of a tertiary amine salt there is no interchange of alkylamino groups. Thus regardless of the amine salt used, in the present reaction the strong protonic acid does not enter into the reaction and does not become part of the borazole molecule. Whether there is an interchange of alkylamino groups or no interchange, the protonic acid only acts to catalyze the reaction to form the borazole molecule.

The following list is an illustrative sample of the many aminoboranes which can be converted to borazoles according to the present method:

I

A. Primary aminoboranes:
  (1) Tris(methylamino)borane
  (2) Tris(ethylamino)borane
  (3) Tris(n-propylamino)borane
  (4) Tris(isopropylamino)borane
  (5) Tris(n-butylamino)borane
  (6) Tris(sec-butylamino)borane
  (7) Tris(tert-butylamino)borane
  (8) Tris(isobutylamino)borane
  (9) Tris(amylamino)borane
  (10) Tris(sec-amylamino)borane
  (11) Tris(tert-amylamino)borane
  (12) Tris(hexylamino)borane
  (13) Tris(sec-hexylamino)borane
  (14) Tris(tert-hexylamino)borane
  (15) Tris(anilino)borane
  (16) Tris(pyridylamino)borane
  (17) Tris(thiophenylamino)borane B. Secondary aminoboranes:
  (1) Tris(dimethylamino)borane
  (2) Tris(diethylamino)borane
  (3) Tris(di-n-butylamino)borane
  (4) Tris(di-isopropylamino)borane
  (5) Tris(allylmethylamino)borane
  (6) Tris(N-methylanilino)borane
  (7) Tris(diphenylamino)borane
  (8) Tris(pyrrolo)borane The following list is an illustrative sample of the many amine salts of strong protonic acids which are applicable to the present invention:

A. Primary amine salts of strong protonic acids:
  (1) Methylamino-hydrochloride, hydrobromide, sulfate, trifluoracetate
  (2) Ethylamine-hydrochloride, hydrobromide, sulfate, trifluoracetate
  (3) n-Propylamine-hydrochloride, hydrobromide, sulfate, trifluoracetate
  (4) Isopropylamine-hydrochloride, hydrobromide, sulfate, trifluoracetate
  (5) Butylamine-hydrochloride, hydrobromide, sulfate, trifluoracetate
  (6) n-Butylamine-hydrochloride, hydrobromide, sulfate, trifluoracetate
  (7) Sec-butylamine-hydrochloride, hydrobromide, sulfate, trifluoracetate
  (8) Tert-butylamine-hydrochloride, hydrobromide, sulfate, trifluoracetate (9) Amylamine-hydrochloride, hydrobromide, sulfate, trifluoracetate
(10) Sec-amylamine-hydrochloride, hydrobromide, sulfate, trifluoroacetate
(11) Tert-amylamine-hydrochloride, hydrobromide, sulfate, trifluoracetate
(12) Hexylamine-hydrochloride, hydrobromide, sulfate, trifluoracetate
(13) Sec-hexylamine-hydrochloride, hydrobromide, sulfate, trifluoracetate
(14) Pyrrolo-hydrochloride, hydrobromide, sulfate, trifluoracetate
(15) Aniline-hydrochloride, hydrobromide, sulfate, trifluoracetate
(16) Pyridylamine-hydrochloride, hydrobromide, sulfate, trifluoracetate
(17) Thiophenylamine - hydrochloride, hydrobromide, sulfate, trifluoracetate B. Secondary amine salts of strong protonic acids:
(1) Dimethylamine-hydrochloride, hydrobromide, sulfate, trifluoracetate
(2) Diethylamine-hydrochloride, hydrobromide, sulfate, trifluoracetate
(3) Di-n-butylamine-hydrochloride, hydrobromide, sulfate, trifluoracetate
(4) Di-isopropylamine-hydrochloride, hydrobromide, sulfate, trifluoracetate
(5) Allylmethylamine-hydrochloride, hydrobromide, sulfate, trifluoracetate
(6) N-methylaniline-hydrochloride, hydrobromide, sulfate, trifluoracetate
(7) Diphenylamine-hydrochloride, hydrobromide, sulfate, trifluoracetate C. Tertiary amine salts of strong protonic acids:
(1) Trimethylamine-hydrochloride, hydrobromide, sulfate, trifluoracetate
(2) Triethylamine-hydrochloride, hydrobromide, sulfate, trifluoracetate
(3) Tri-n-propylamine-hydrochloride, hydrobromide, sulfate, trifluoracetate
(4) Tri-n-tributylamine-hydrochloride, hydrobromide, sulfate, trifluoracetate
(5) Tri-isobutylamine-hydrochloride, hydrobromide, sulfate, trifluoracetate
(6) Trihexylamine-hydrochloride, hydrobromide, sulfate, trifluoracetate
(7) Triphenylamine-hydrochloride, hydrobromide, sulfate, trifluoracetate
(8) Pyridine-hydrochloride, hydrobromide, sulfate, trifluoracetate
(9) Quinoline-hydrochloride, hydrobromide, sulfate, trifluoracetate So that the present invention can be more clearly understood, the following illustrative examples are given:

I

Nineteen parts of isopropylamine hydrochloride and 37 parts of tris(isopropylamino)borane were heated at reflux until evolution of isopropylamine ceased, about 40 hours. The mixture was cooled, triturated with petroleum ether and filtered. The filtrate was distilled and yielded B-tris(isopropylamino) - N - triisopropylborazole, $N_D^{24}$ 1.4601.

II

Thirty parts of tris(isopropylamino)borane and 12 parts of methylamine hydrochloride were heated together for 60 hours and then treated as in Example I. Distillation of the filtrate yielded triisopropyltrimethyl-B-triaminoborazole, B.P. 134–142/1 mm., $n_D^{26}$ 1.4761. Chemical analysis showed 10.9% B and 26.9% N.

III

Thirty parts of tris(anilino)borane and 15 parts of trimethylamine sulfate were heated at reflux for about 70 hours. The product was recrystallized from triethylamine and then from chloroform to yield B-tris(anilino)-N-triphenylborazole, a white powder which turned brown on standing.

It is well known to those skilled in the art that the presence of boron in gasoline advantageously affects the ignition and octane rating of the gasoline. The borazoles of the present invention when added to gasoline will be found to provide an improved fuel for internal combustion engines. Further, the present borazoles when added to diesel oil will aid in preventing sludging of the oil, and when added to jet aircraft fuel will act as an anti-icing agent.

Other modes of applying the principle of the invention may be employed provided the features stated in any of the following claims or the equivalent of such be employed.

We, therefore, particularly point out and claim as our invention:

1. The method of producing borazoles which comprises heating at reflux a tris(amino)borane selected from the group consisting of $(RNH)_3B$ and $(R_2N)_3B$ wherein R is a radical selected from the group consisting of alkyl radicals having from 1–6 carbon atoms, phenyl, thiophenyl and pyridyl, with a material selected from the group of amine salts of strong protonic acids consisting of $RNH_2 : HA$, $R_2NH : HA$ and $R_3N : HA$ wherein R is a material selected from the group consisting of alkyl radicals having from 1–6 carbon atoms, phenyl, thiophenyl and pyridyl, HA is a strong protonic acid selected from the group consisting of hydrochloric, hydrobromic, sulfuric and trifluoroacetic acids and wherein at least one of said reaction ingredients is derived from a primary amine.

2. The method of producing B-tris(isopropylamino)-N-triisopropylborazole which comprises heating at reflux tris(isopropylamino)borane with isopropylamine hydrochloride.

3. The method of producing triisopropyltrimethyl-B-triaminoborazole which comprises heating at reflux tris(isopropylamino)borane with methylamine hydrochloride.

4. The method of producing B-tris(anilino)-N-triphenylborazole which comprises heating at reflux tris(anilino)borane with trimethylamine sulfate.

References Cited in the file of this patent

UNITED STATES PATENTS 2,821,463    Scott et al. _____ Jan. 28, 1958